June 30, 1964     A. J. ABODEELY     3,138,816
WINDSHIELD WIPER
Filed Sept. 18, 1962
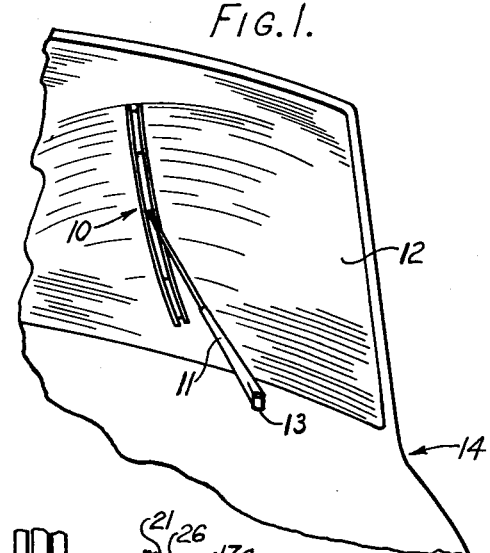
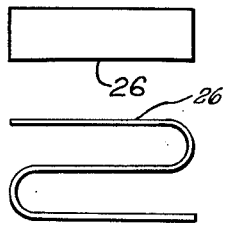
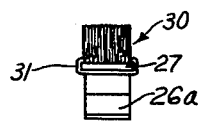
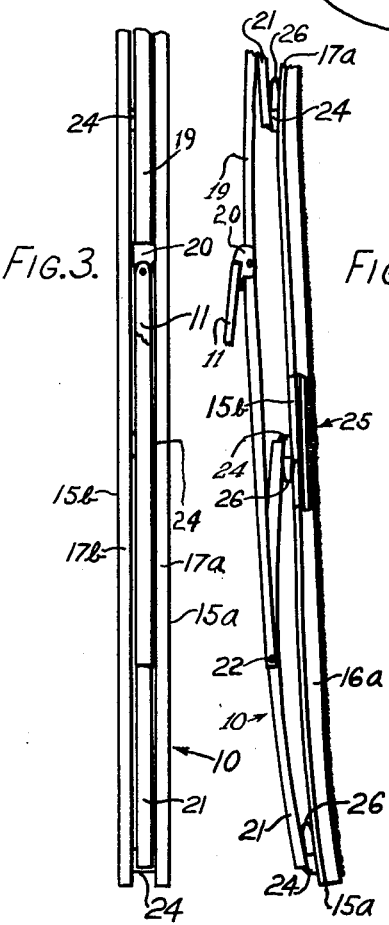
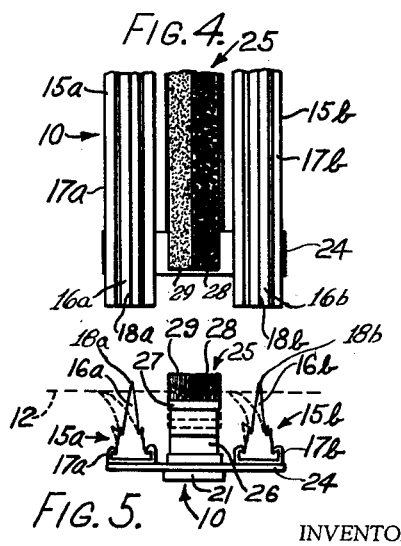
INVENTOR.
ALEX J. ABODEELY
BY
ATTORNEY

United States Patent Office 3,138,816
Patented June 30, 1964

3,138,816
WINDSHIELD WIPER
Alex J. Abodeely, 3220 1st Ave. NE.,
Cedar Rapids, Iowa
Filed Sept. 18, 1962, Ser. No. 224,309
5 Claims. (Cl. 15—250.41)

This invention relates to windshield wipers and relates particularly to a wiper having multiple elements in contact with the windshield. These elements in combination provide fast removal of foreign material from the face of the windshield with back and forth movement of the wiper over the face of the windshield while in use.

Many windshield wipers feature a single flexible, resilient, elongated wiping element which is resiliently maintained by the wiping structure, in wiping contact with the surface to be wiped whether flat or curved. These wipers generally perform satisfactorily as long as only clear rain water must be removed. However, wipers of this type having only flexible, resilient elongated elements in contact with the windshield generally slide over various foreign elements having a tendency to adhere to the windshield.

It is, therefore, a principal object of this invention to provide for fast and assured cleaning of a windshield.

Another object is to provide for fast breakage and removal of ice or sleet formed on a windshield and to prevent build up of ice or sleet which would otherwise occur on the windshield.

Features in the accomplishment of these objects are the provision of two spaced generally parallel flexible resilient elongated wiping blades and an elongated brush member extending generally in parallel relation with, between, and spaced from the two wiping blades. The wiping blades and the brush member are resiliently biased into conforming wiping contact with the windshield surface by structure of the windshield wiper to obtain a combined wiping and brush scraping action when in use. This has proven very effective in loosening deposits and providing the fast removal of many materials sticking to a windshield that would severely resist removal by commonly known one bladed wipers. The brush member is resiliently biased into windshield conforming relation by springs having a relatively low rate flexing range generally normal to the surface of the windshield but which impart great resistance to side displacement or tilting to the brush member. This is provided with S-shaped springs formed of bands having considerably greater width than thickness.

A specific embodiment representing what is presently regarded as the best mode of carrying out the invention is illustrated in the accompanying drawing.

In the drawing:

FIG. 1 represents a fragmentary view of the windshield portion of an automobile showing a windshield wiper conforming to the invention installed in place for use on the windshield;

FIG. 2, a side elevation of the windshield wiper partially cut away for greater detail;

FIG. 3, a top view of the windshield wiper;

FIG. 4, a fragmentary bottom view showing brush member and wiper blade detail;

FIG. 5, an end view of the windshield wiper not installed, and in phantom the position of the brush member and resilient deformation of the wiper blades for an installed wiper when in motion left to right across the surface of a windshield;

FIG. 6, a top view of an S spring;

FIG. 7, an S spring side view; and

FIG. 8, an end view of another windshield wiper brush and spring mounting embodiment.

Referring to the drawings;

A windshield wiper 10, conforming to the invention, is shown in FIG. 1 to be mounted on driving arm 11 as installed for use in cleaning the face of windshield 12. Driving arm 11 is fastened to wiper 10 and exerts continuous resilient force in a conventional manner for holding the wiper in operational contact with the windshield. The arm 11 is mounted through power driven pivot member 13 to vehicle 14 and connected to conventional drive means (not shown) for reciprocating back and forth wiping movement of the wiper 10 in cleaning the windshield.

Referring also to FIGS. 2 and 3 wiper 10 is shown to have two duplicate wiper blades 15a and 15b. These blades have flexible, resilient, elongated wiping elements 16a and 16b, respectively, and an elongated resiliently flexible mounting member 17a and 17b, respectively, therefore extending substantially the length of the wiping elements. Mounting members 17a and 17b lend resiliently flexible, surface conforming, support for the wiping elements 16a and 16b throughout the lengths thereof for maintaining the longitudinal wiping edges 18a and 18b in proper operational wiping relation to the face of windshield 12.

The windshield directed resilient engaging force exerted by driving arm 11 is transmitted to wiper blades 15a and 15b through intermediate structure. This intermediate structure includes, a relatively stiff yet resiliently flexible main bridge member 19, connected to arm 11 by pivot hinge connector 20, and two relatively stiff sub bridge members 21 each pivot pin 22 connected to opposite ends of bridge member 19. The intermediate structure also includes cross bars 24 fastened in transverse relation, as by clamping or pins, to opposite ends of each sub bridge member 21. Cross bars 24 are connected by conventional means (not shown) to mount wiper blades 15a and 15b in spaced generally parallel relation. The intermediate structure with pivot pin 22 mountings of sub bridge members 21 and the spacing of the end connections of the bridge members 21 with cross bars 24 balances the force applied and translated through the relatively flexible mounting members in maintaining substantially uniform wiper blade contact with the windshield. Each wiper blade 15a and 15b individually is of conventional construction and performs a normal wiping action and, if connected directly, without cross bars 24, as a single wiper blade to the intermediate structure would constitute a conventional windshield wiper. Obviously, any of many conventional windshield mounting drive systems and intermediate structures could be utilized in place of the intermediate structure shown for mounting cross bars 24.

An elongated brush member 25 is mounted generally parallel with, between, and in spaced relation from the wiping elements 16a and 16b as shown in greater detail by FIGS. 4 and 5. This relationship between the parts is maintained by mounting S-shaped springs 26 which are fastened to the sub bridge members 21, or the cross bars 24, and the backing 27 of brush member 25. Cross bars 24, are so shaped, and the S springs positioned, that operational interference is normally avoided. Brush backing 27 is resiliently flexible throughout its length along the back of brush member 25 and translates resilient force imparted thereto through S springs 26 to substantially uniform operational brush fiber or bristle contact with the face of windshield 12. S springs 26 (shown in greater detail by FIGS. 6 and 7) are also so chosen that operating force of the brush 25 and of the wiper blades 15a and 15b are properly balanced. The S shaped springs 26 are formed of bands characterized by their considerably greater width than thickness. They are so oriented as to substantially eliminate transverse movement of the brush 25 relative to the wiper structure. The brush movement is substantially limited by springs 26 to biased movement normal to the face of the windshield 12. The considerably greater width as opposed to thickness of the bands forming springs 26 resists forces tending to transversely displace or tilt brush 25. This helps insure that brush 25 does not move into interfering contact with the trailing wiper blade 15a or 15b as the wiper 10 is being moved over the face of windshield 12.

When wiper 10 is in operational engagement with the face of windshield 12 as shown in FIG. 5 the brush 25 is pushed back against the resilient force of S springs 26 to the position indicated in phantom. Simultaneously while windshield wiper blades 15a and 15b are deformed, for example, as shown in phantom when the wiper 10 is moving from left to right. Since interference between the wiper blades 15a and 15b and the brush 25 can prove detrimental to proper operational functioning of each it is desirable that the wiper blades 15a and 15b be spaced as shown. There should be ample space for operational deformation of the wiper blades as shown in phantom in FIG. 5 without contact with brush 25.

Other embodiments may be constructed where the wiping edge of the trailing blade is clear of interference with the brush in a more closely spaced brush to wiper blade construction than shown and still fall within the teaching of my invention. In addition, other resilient biasing means could be used in place of the S springs 26, or other springs having the same width to thickness imparted characteristics as long as suitable transverse supporting or restraining means is provided for brush 25. If the wiper blades were more cosely spaced shielding or guide means could be utilized to prevent interference between the leading blade, in the direction of motion, and the brush and still fall within the sphere and intent of the teachings of my inventive contribution to the art.

With continued reference to FIGS. 4 and 5 brush member 25 has contiguous brush portions, a stiff bristle portion 28 and a fine brush portion 29 extending longitudinally in side by side relation the length of the brush. The stiff bristle portion 28 is particularly useful for breaking loose foreign matter tending to stick on the windshield, while the fine light brush portion 29 provides a beneficial whisking action moving loosened material away from the surface. Should there be insufficient fluid to maintain a good wiping away action by wiper blades 15a and 15b fluid could be added as by conventional windshield washers (not shown).

Please refer to FIG. 8 for an alternate brush embodiment. Brush 30 is removably mounted in clamps 31 integrally formed on S springs 26a which may be mounted in a windshield wiper 10 in place of S springs 26. This permits alternate use of a fine brush and a stiff bristle brush as desired and as needed, as for example by season of the year. A soft fine brush may do the job during warm weather while the heavier stiff bristle brush may be required during the winter for breaking and removal of ice, sleet, or frost.

Whereas this invention is here illustrated and described with respect to a preferred embodiment and several alternate embodiments thereof, it should be understood that various changes may be made without departing from the essential contribution to the art by the teachings hereof.

I claim:
1. In a windshield wiper for removal of water and foreign material from the face of a windshield, a wiper assembly mounted on a single driving arm extending from a power driven pivot member and exerting continuous resilient force for holding the wiper assembly in operational contact with the windshield and for driving the wiper assembly in operation back and forth across the face of the windshield, and with the wiper assembly including: flexible, resilient, elongated wiping blade means for wiping contact with the face of the windshield; brush means presenting a brush face engaging the face of the windshield; means for translating resilient force of the single driving arm into force resiliently biasing said wiping blade means into substantially uniform wiping contact with the windshield surface; means for translating resilient force of the single driving arm into force resiliently biasing said brush means into substantially uniform conforming brush contact with the face of the windshield; and said wiping blade means being mounted in substantially parallel relation with said brush means, with said flexible, resilient, elongated wiping blade means including two wiping blades mounted in substantially parallel spaced relation on intermediate structure of the wiper assembly; and with said brush means mounted on said intermediate structure between said wiping blades by a plurality of mounting springs.

2. The wiper assembly of claim 1 wherein sufficient space is provided between the wiping blades and the respective sides of said brush means to avoid contact between said blades and the brush means during operational movement of the windshield wiper across the face of the windshield.

3. The wiper assembly of claim 1, wherein said brush means includes two contiguous side by side brush portions extending longitudinally the length of said brush means; one of said brush portions comprising a relatively soft, fine brush portion; and the other brush portion comprising a relatively stiff bristle portion.

4. The wiper assembly of claim 1, wherein said wiper blades and said brush means are spaced from each other; wherein said brush resilient biasing means includes mounting springs formed from bands characterized by having substantially greater width than thickness for obtaining a resiliently biasing action substantially normal to the face of the windshield while resisting forces tending to transversely displace or tilt the brush in the windshield wiper.

5. The wiper assembly of claim 4, wherein said mounting springs are S-shaped springs.

References Cited in the file of this patent
UNITED STATES PATENTS

| | | |
|---|---|---|
| 2,273,817 | Chellew | Feb. 24, 1942 |
| 2,888,702 | Sussex | June 2, 1959 |
| 3,047,898 | Levite | Aug. 7, 1962 |